United States Patent [19]  [11] 4,101,519
Hallgren  [45] Jul. 18, 1978

[54] POLYCARBONATE EQUILIBRATION METHOD

[75] Inventor: John E. Hallgren, Scotia, N.Y.

[73] Assignee: General Electric Company, Schenectady, N.Y.

[21] Appl. No.: 786,793

[22] Filed: Apr. 12, 1977

[51] Int. Cl.$^2$ .............................................. C08G 63/62
[52] U.S. Cl. ................................... 528/197; 260/463; 260/857 G
[58] Field of Search ........... 260/463, 47 X A, 77.5 D, 260/49

[56] References Cited

U.S. PATENT DOCUMENTS

| | | | |
|---|---|---|---|
| 3,028,365 | 4/1962 | Schnell | 260/47 |
| 3,153,008 | 10/1964 | Fox | 260/47 |
| 3,223,678 | 12/1965 | Bolgiano | 260/47 |

Primary Examiner—Theodore E. Pertilla
Attorney, Agent, or Firm—William A. Teoli; Joseph T. Cohen; Charles T. Watts

[57] ABSTRACT

An equilibration method is provided for modifying aromatic polycarbonates with monohydricphenol or dihydricphenol. Polycarbonate modification can be achieved under ambient conditions or at elevated conditions based on the use of a tertiary amine catalyst and an organic solvent.

8 Claims, No Drawings

POLYCARBONATE EQUILIBRATION METHOD

The present invention relates to a method for modifying aromatic polycarbonate by equilibrating monohydricphenols or dihydricphenols into the polymer backbone, based on the use of a tertiary amine catalyst and an organic solvent.

Prior to the present invention, high molecular weight polycarbonates were manufactured by phosgenating a dihydricphenol or by effecting an ester interchange between a dihydricphenol and a diorgano carbonate. Generally, aromatic polycarbonate made in accordance with the aforementioned procedure is produced at a high molecular weight and has a high impact value. In particular situations, reduction of the molecular weight of the polycarbonate is desirable or modification of the polymer backbone with reactive functional groups to achieve specific polymer characteristics is sometimes desirable.

The present invention is based on the discovery that aromatic polycarbonates consisting essentially of chemically combined units of the formula

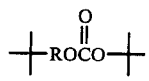
(1)

where R is a $C_{(6-30)}$ divalent aromatic organic radical, can be modified by introducing into the polycarbonate backbone as terminal chain-stopping units, monohydric aromatic phenols, or dihydric aromatic phenols, by employing a tertiary organic amine catalyst and an organic solvent. The polycarbonate, for example, Lexan polycarbonate, a product of the General Electric Company, can be equilibrated with phenol, bisphenol-A, or derivatives thereof, utilizing triethyl amine and an organic solvent, such as methylene chloride under ambient conditions, or in an autoclave. A reduction in the intrinsic viscosity of the original polymer can be achieved resulting in the formation of a lower molecular weight polycarbonate terminated with functional groups derived from monohydric phenols or dihydric phenols employed during the equilibration.

In accordance with the present invention, there is provided a method for reducing the molecular weight of aromatic polycarbonate consisting essentially of chemically combined units of formula (1), which comprises (A) agitating a mixture of the polycarbonate, a phenol of the formula,
$$QOH \qquad (2)$$
an organic solvent and an effective amount of a tertiary amine catalyst, (B) effecting the separation of polycarbonate from the mixture of (A) and (C) recovering the polycarbonate from the mixture of (B), where Q is selected from $R^1-$, HOR— and $ZR^2-$, R is as previously defined, $R^1$ is a $C_{(6-13)}$ monovalent aromatic organic radical, $R^2$ is a $C_{(6-13)}$ divalent aromatic organic radical, and Z is a monovalent radical selected from carboxy, a $C_{(2-8)}$ olefinic hydrocarbon radical, and and $MSO_3$ radical, where M is an alkali metal, halogen, phosphate, or amino.

Radicals included by R of formula (1) are, for example, phenylene, tolylene, chlorophenylene; divalent alkylene arylene radicals, such as ethylene phenylene, propylene, propylene phenylene, etc.; radicals such as

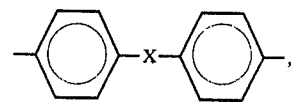

where X is 1,1-cyclopentyl, —O—, —$OC_6H_5O$—, S, cyclohexyl, fluorenyl,

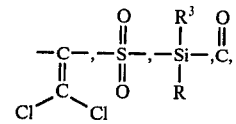

and —$C_yH_{2y}$—, where $R^3$ is selected from methyl and phenyl and $y$ is an integer equal to 1 to 5 inclusive. Radicals included by $R^1$ are, for example, aryl radicals such as chlorophenyl, tolyl, naphthyl, etc.; aralkyl radicals, such as benzyl, phenyl ethyl, etc. Radicals included by $R^2$ are, for example, the divalent aryl radicals previously shown above for R radicals.

Phenols included by formula (2) are, for example, monohydric phenols, such as 2-allylphenol, 4-tertiarybutyl acid, sodium salt, 2-hydroxy acetophenone, salicylaldehyde, etc., and dihydric phenols, such as Bisphenol-A, 2,2-bis(4-hydroxyphenyl)-1,1-dichloroethylene, bis(4-hydroxyphenyl)sulfane, resourcinol, hydroquinone, etc.

Included by the tertiary organic amines which can be employed in the practice of the present invention are, for example, triethylamine, pyridine, 2,2,6,6,N-pentamethylpiperdine, trimethylamine, lutedine, tributylamine, diisopropyl-N-ethyl amine, N,N-dimethylaniline, etc. Organic solvents which can be employed in the practice of the invention are any substantially inert organic solvents, such as methylene chloride, chloroform, tetrahydrofuran, dioxane, dimethylformamide, trichloroethane, tetrachloroethylene, chlorobenzene, etc.

The polycarbonates which can be employed in the practice of the present invention are any aromatic polycarbonates generally made by the reaction of dihydric phenol and a carbonyl halide. Some of the dihydric phenols which can be employed are, for example 1,1-bis(4-hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, etc., dihydric phenol ethers such as bis(4-hydroxyphenyl)-ether, bis(3,5-dichloro-4-hydroxyphenyl)-ether, etc., dihydroxy diphenyls such as p,p'-dihydroxydiphenyl, 3,3'-dichloro-4,4'-dihydroxydiphenyl, etc., dihydroxyaryl sulfones, such as bis(4-hydroxyphenyl)-sulfone, bis(3,5-dimethyl-4-hydroxyphenyl)-sulfone, bis(3-methyl-5-ethyl-4-hydroxyphenyl)-sulfone, etc., dihydroxy benzenes, resorcinol, hydroquinone, halo and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-dihydroxyphenyl)-sulfoxide, bis(3,5-dibromo-4-hydroxyphenyl)-sulfoxide, etc. A variety of additional dihydric phenols are also available to provide carbonate polymers and are disclosed in U.S. Pat. Nos. 299,835, 3,028,365, and 3,153,008. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the polycarbonates employed in this invention.

In the practice of the invention, a mixture of the polycarbonate organic solvent, tertiary amine and the phenol of formula (2), which hereinafter will represent both a monohydric phenol and dihydric phenol, is agitated to effect equilibrium. The rate of equilibrium will depend upon such factors as the temperature employed, the amount particular tertiary amine catalyst utilized, etc. The tertiary amines can be used from 1% to as high as 10%, based on the weight of polycarbonate, depending upon the rate of equilibration desired. Higher or lesser amounts also can be used.

It has been found that effective results can be achieved under ambient conditions over a period of from 1 to 48 hours. Reflux temperatures may provide for reduced reaction time over a broad range of pressures and temperatures, such as from 0° to 200° C. In certain instances, an autoclave can be used if desired.

Recovery of the equilibrated polycarbonate can be effected by standard techniques, such as pouring the mixture into a precipitating solvent, such as methanol. The degree of equilibration can readily be determined by standard techniques, such as by measuring the intrinsic viscosity of the polycarbonate before and after the equilibration of the polymer.

The equilibrated polycarbonates which are made in accordance with the practice of the method of the present invention can be employed as intermediates for the production of polycarbonate block copolymers, as additives for conventional high molecular weight thermoplastic polycarbonates, such as Lexan polycarbonate and used in the production of film forming materials which can be modified as a result of the nature of the functional groups which are introduced as a result of the equilibration reaction. For example, the sulfonate terminated polycarbonate intermediates made in accordance with the present invention can be employed as flame retardant additives for Lexan polycarbonate which can be introduced by either a solution blending technique or a melt blending technique. In instances where the terminal groups are unsaturated, cure of such materials can be effected by a free radical mechanism, etc.

In order that those skilled in the art will be better able to practice the invention, the following examples are given by of illustration and not by way of limitation. All parts are by weight.

EXAMPLE 1.

A mixture of 8 parts of Lexan® polycarbonate (145-111), a polycarbonate consisting essentially of bisphenol-A carbonate units within the scope of formula (1) and having an intrinsic viscosity of 0.53 dl/g- 0.767 part of sodium p-phenol sulfonate, 1.08 part of triethyl amine, 130 parts of methylene chloride and about 100 parts of dimethylformamide was stirred in a high pressure autoclave at 100° C for 4 hours. The mixture was then allowed to cool to room temperature. The mixture was filtered and evaporated to dryness under reduced pressure. The resulting solids were extracted and filtered. There was obtained 0.36 part of a precipitate which was identified as unreacted sodium p-phenol sulfonate. The filtrate was then concentrated and added slowly to methanol. A product precipitated which was recovered and dried at 100° C for about 12 hours. There was obtained 7.47 parts of product which represented an 89% yield. Based on method of preparation, the product was a polycarbonate having chemically combined terminal sulfonate phenylene carbonate linkages. The identity of the product was further confirmed by sulfur analysis which showed a 0.73 percent by weight of chemically combined sulfur. This accounted for 97% of the unrecovered sodium p-phenol sulfonate. The intrinsic viscosity of the product was about 0.3 as compared to the intrinsic viscosity of the Lexan polycarbonate of 0.5, where both intrinsic viscosities were measured in methylene chloride at 25° C. In addition, the following table shows GPC data comparing the molecular weight of the original Lexan polycarbonate to the resulting sulfonate terminated polycarbonate:

|  | $\overline{M}_n$ | $\overline{M}_w$ | $\overline{M}_w/\overline{M}_n$ |
| --- | --- | --- | --- |
| Lexan Polycarbonate | 17,939 | 51,669 | 2.88 |
| Sulfonate Polycarbonate | 5,767 | 11,080 | 1.92 |

Equal parts of Lexan polycarbonate and the above sulfonate polycarbonate are melt blended at a temperature of about 275° C to achieve a uniform blend which is molded into a test slab. It is found that the flame retardance of the sulfonate containing blend is significantly greater than the flame retardance of the original Lexan polycarbonate free of sulfonate polycarbonate.

EXAMPLE 2.

A mixture of 2 parts of Lexan 145-111 polycarbonate powder, 0.068 part of bisphenol-A, 0.46 part of diisopropylethyl amine and 100 parts of methylene chloride was stirred under ambient conditions for 12 hours under dry nitrogen. The mixture was then concentrated under reduced pressure at room temperature and then poured into methanol. There was obtained 1.99 parts or a 97% yield of polycarbonate, which was dried at 100° C under reduced pressure for a period of about 16 hours. The intrinsic viscosity of the resulting polycarbonate in chloroform at 25° C was found to be about 0.2 as compared to the original intrinsic viscosity of the Lexan polycarbonate, which was 0.5 in methylene chloride at 25° C.

EXAMPLE 3.

A mixture of 10 parts of Lexan polycarbonate, 0.37 part of p-t-butylphenol, 130 parts of methylene chloride and 1 part of 2,2,6,6-N-pentamethylpiperidine was stirred at room temperature for 48 hours. The mixture was then stripped of solvent to 50% of its original volume and added to methanol. A product precipitated which was recovered and dried over night at 100° C. There was obtained 9.94 parts of product representing a 96% yield. Based on method of preparation the product was a tertiary butylphenol terminated polycarbonate. Its identity was confirmed by GPC and NMR spectrum, which indicated a ratio of about 26 units derived from bisphenol-A to one unit derived from p-t-butylphenol.

EXAMPLE 4.

A solution of 12.7 parts of Lexan polycarbonate, 130 parts of methylene chloride, 0.5 part of 2-allylphenol and 0.3 part of triethylamine is stirred under an inert atmosphere for 48 hours at room temperature. The product is recovered in accordance with the previously described procedure. The product is found to have a molecular weight of about 5000. Based on method of preparation, the product is a polycarbonate having terminal allyl phenol groups. It can be cross-linked with a free radical initiator, such as dicumylperoxide to increase its solvent resistance.

Although the above examples are directed to only a few of the very many variables included by the method of the present invention, it should be understood that the method of the present invention includes a much broader variety of phenols of formual (2) in combination with polycarbonates consisting essentially of units of formula (1).

What I claim as new and desire to secure by Letters Patent of the U.S. is:

1. A method for reducng the molecular weight of aromatic polycarbonate consisting essentially of chemically combined units of the formula,

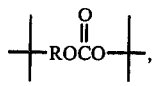

which comprises, (A) agitating a mixture of the polycarbonate, a phenol of the formula,

QOH, a substantially inert organic solvent and an effective amount of a tertiary amine catalyst, (B) effecting the separation of polycarbonate from the mixture of (A) and (C) recovering the polycarbonate from the mixture of (B), where Q is selected from $R^1-$, $HOR-$ and $ZR^2-$, R is a $C_{(6-30)}$ divalent aromatic organic radical, $R^1$ is a $C_{(6-13)}$ monovalent aromatic organic radical, $R^2$ is a $C_{(6-13)}$ divalent aromatic organic radical, and Z is a monovalent radical selected from carboxy, a $C_{(2-8)}$ olefinic hydrocarbon radical and an $MSO_3$ radical, where M is an alkali metal, halogen, phosphate, or amino.

2. A method in accordance with claim 1, where the polycarbonate is a bisphenol-A polycarbonate.

3. A method in accordance with claim 1, where the phenol is a monohydric phenol.

4. A method in accordance with claim 1, where the phenol is a dihydric phenol.

5. A method in accordance with claim 1, where the phenol is a parahydroxy benzene sulfonic acid, sodium salt.

6. A method in accordance with claim 1, where the phenol is allyl phenol.

7. A method in accordance with claim 1, which results in the production of polycarbonate having chemically combined groups derived from the phenol in the backbone of the polycarbonate.

8. A method in accordance with claim 1, which results in the production of polycarbonate having terminal phenol groups.

* * * * *